Patented Aug. 22, 1950

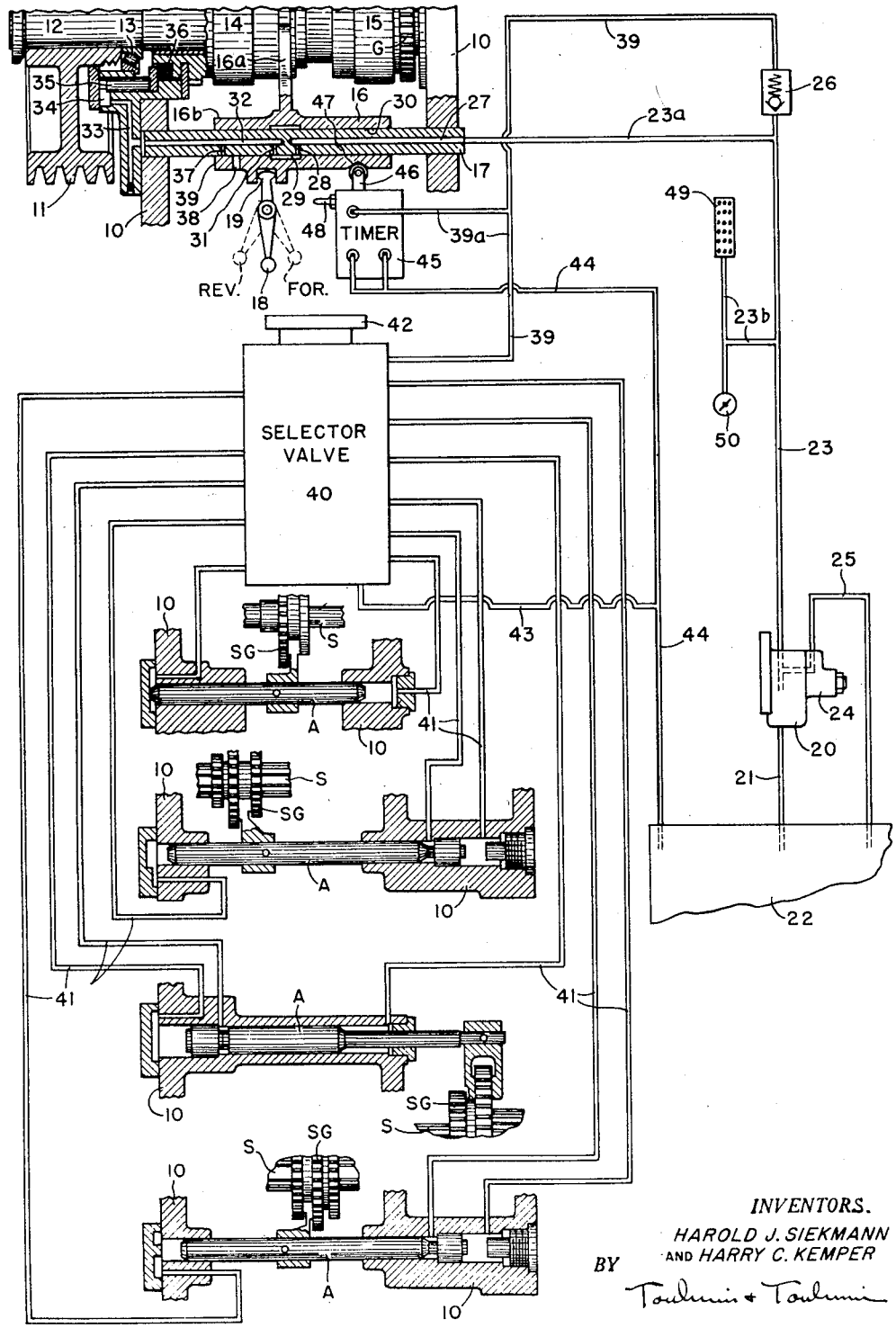

2,519,794

UNITED STATES PATENT OFFICE 2,519,794

HYDRAULIC GEAR SHIFTING MECHANISM

Harold J. Siekmann, Cincinnati, and Harry C. Kemper, Goshen Township, Clermont County, Ohio, assignors to The R. K. Le Blond Machine Tool Co., Cincinnati, Ohio, a corporation of Delaware Application February 5, 1946, Serial No. 645,616

13 Claims. (Cl. 192—3.5)

1

This invention pertains to hydraulic gear shifting mechanism and is particularly directed to hydraulically operated speed changing gear for machine tool transmissions.

One of the objects of this invention is to provide a hydraulic gear shifting mechanism, rate varying or speed changing device for a lathe headstock which is automatically adjustable by a suitable control mechanism for said rate changing or varying device for either preselection or direct speed change selection in response to the operating conditions of the power clutch or main drive to the transmission.

Another object of this invention is to provide, in a hydraulic gear shifting mechanism, a time delay control means which may take the form of a time responsive control, an elapsed time responsive means, a time interval responsive control device, or any suitable means responsive to the elapse of a predetermined period of time such as a conventional time delay hydraulic valve, a timer by-pass control valve, or a time responsive by-pass valve for momentarily maintaining direct power selection of the speed changes after the main source of driving power has been applied to rotate the transmission at full operating speed.

Another object of this invention is to provide, in a hydraulic gear shifting mechanism for a machine tool transmission, an arrangement for automatically rendering the selector means directly effective to effect speed changes when the drive power is disconnected from rotating the transmission and which arrangement also automatically maintains direct selection of speed changes by the selector means for a predetermined interval after the main drive power has been connected to rotate the transmission at operating speed.

Another object of this invention lies in the provision of a timing control mechanism associated with the hydraulic selector valve of a hydraulic gear shifting mechanism to automatically confine the shifting of the various gear members to certain operating conditions of the change speed transmission.

Further features and advantages of this invention will appear from a detailed description of the drawings in which:

In the figure, is shown a diagram of a hydraulic gear shifter arrangement incorporating the features of this invention.

For illustrative purposes, this novel hydraulic gear shifting mechanism rate varying or speed changing device and control circuit or mechanism

2 for the gear shifting mechanism is shown diagrammatically applied to a lathe headstock having a main housing or frame 10. The main drive pulley 11 is mounted on the input shaft 12 which is journaled on suitable bearings 13. The pulley 11 is driven by any constant speed prime mover (not shown) to apply power to a pair of reversing clutches 14 and 15. One or the other of these clutches may be rendered operative to connect power from the source of driving power or pulley 11 through the shaft 12 to the lathe transmission gearing G and SG and shafts S in a conventional manner by the actuation of the shifter fork 16. This fork has a projecting yoke member 16a operatively engaging the clutches 14 and 15 and has the hub portion 16b slidably mounted on a shaft 17 fixed in the headstock housing 10. A suitable control lever 18, operatively connected at 19 with the shifter yoke 16, provides means for manually engaging one or the other of the clutches 14 and 15 for either direction of rotation of the headstock transmission or for disconnecting power from the transmission when the lever is in an intermediate neutral position, as shown in the drawing.

The gear shifting mechanism is operated by fluid pressure provided by a fluid pressure pump 20 actuated by any suitable source of power (not shown). The pump receives a supply of fluid through a suction line 21 from a fluid reservoir 22 and transmits fluid pressure to the pressure supply line 23. A high pressure relief valve 24 is connected to the line 23 and exhausts through a drain line 25 to the reservoir 22 to limit the over all pressure in the system and line 23 to a safe maximum limit for the hydraulic system. Line 23 is connected to a lower pressure relief valve 26 having a pressure setting value below that of the high pressure valve 24 and set at a desirable operating pressure for the gear shifting and associated control mechanisms.

A branch line 23a is connected to a coaxial passageway 27 formed in the shaft 17 from which radially extends a passageway 28 to the periphery of the shaft 17 for communication with a fluid passageway or annular groove 29 formed in the bore 30 of the shifter yoke 16. A second radially disposed passageway 31 is formed in the shaft 17 and is in communication with the coaxial passageway 32 formed in the shaft 17. The passageway 32, in turn, is connected through a passageway 33 to the pressure chamber 34 of the hydraulic brake mechanism having fluid pressure operated plungers 35 actuated by fluid in the chamber 34 to engage or disengage the multiple disc brake 36.

The passageway 29 in the shifter yoke 16 is so positioned relative to the passageways 28 and 31 when the control lever 18 is shifted to the neutral position with both of the clutches 14 and 15 disengaged from driving condition that the passageways 28 and 31 will be in communication through the passageway 29 so that pressure from the pump 20 and the lines 23 and 23a will be transmitted to the pressure chamber 34 to engage the multiple disc brake 36 and arrest rotation of the headstock transmission gearing and shafts. Whenever the lever 18 is shifted to the forward or reverse position, fluid pressure from the passageway 28 will be cut off from operating the multiple disc brake 36 while a third radial passageway 37 is connected to exhaust pressure either through the opening 38 in the shifter yoke 16 or past the outer edge 39 of the yoke so as to relieve fluid pressure in the pressure chamber 34 and thereby release the multiple disc brake 36. Thus, in this arrangement, fluid pressure from the pump 20 serves to stop rotation of the lathe transmission.

Fluid pressure discharged from the low pressure relief valve 26 is conducted through a line 39 to the manually operable selector valve 40 of the hydraulic gear shifting mechanism which includes the supply lines 41 to the various pressure actuated shifting devices indicated generally at A connected to actuate the various shiftable gears SG in a conventional manner. A control knob 42 provided on the selector valve 40 may be manipulated to adjust the valve to apply pressure from the line 39 in a predetermined sequential relationship to the various hydraulic shifting mechanisms A to shift the gears SG in a predetermined relationship for selecting various speed changes. Discharge from the selector valve is conducted through a drain line 43 to the drain line 44 for return of fluid to the reservoir 22.

Associated with the selector valve 40 is the time responsive control means which may take the form of a conventional time delay by-pass or timer valve 45 which is connected through a branch line 39a with the pressure supply line 39. Discharge from the valve 45 is connected to the drain line 44 for return of fluid to the reservoir 22. The valve 45 has an operating plunger 46 which, when extended with its roller riding in the V notch 47 of the shifter yoke 16 when in neutral position of disengagement of both of the clutches 14 and 15, cuts off fluid pressure from the line 39a so that it can not enter the drain line 44. Pressure is thus maintained in the line 39a supplying the selector valve 40. As the yoke 16 is moved to either side of the neutral position, the plunger 46 will be depressed as it rides out of the V notch 47. This movement of the plunger 46 initiates the timing mechanism in the valve 45 to momentarily maintain the line 39a cut off from the drain line 44 to maintain operating pressure supply to the selector valve 40 for a definite interval of time after the yoke 16 has been moved to either of its operative positions of engagement of the clutch 14 or 15. After the predetermined period has elapsed, and which period may be varied as desired by means of a suitable adjusting means 48, the valve automatically then opens the line 39a to the drain line 44 causing pressure in the line 39 to escape through the drain line 44 and return to the reservoir 22 thereby reducing the pressure in the line 39 to zero. Under these conditions of zero fluid pressure supply to the selector valve, the gear shifting mechanism is ineffective to shift the gears when the knob 42 of the selector valve 40 is adjusted. This arrangement permits a preselection of the next desired position of shifted gears to obtain a new speed range when the main drive clutches are again disengaged from driving the headstock transmission, the plunger 46 of the valve 45 dropping into the V notch 47 in the shifter yoke 16 causing pressure to build up in the line 39 supplying the selector valve.

When the spindle control clutch lever 18 is in the neutral position, as shown in the diagram, the plunger 46 of the timer valve 45 is extended so as to cut off the line 39a from communication with the drain line 44. Fluid pressure discharging from the low pressure relief valve 26 through the line 39 then enters the selector valve and renders it effective to operate the various shifting devices A whenever the control knob 42 of the selector valve 40 is rotated to the desired position of speed selection. When the main drive clutch lever 18 is moved to one or the other of its forward or reverse operating positions to effect rotation of the lathe transmission by the prime mover, the plunger 46 of the timer valve 45 is actuated. However, fluid pressure continues to be applied for a predetermined period of time, determined by the setting of the adjusting screw 48, from the line 39 to the selector valve 40 so as to make sure that all of the shiftable gears SG have fully and properly engaged their respective mating gears for the desired speed selected as the transmission accelerates to full running speed upon engagement of clutch 14 or 15. After the predetermined period has elapsed, the timer valve 45 then automatically connects line 39a to the drain line 44 relieving pressure from the selector valve 40. The selector valve may then be turned to any desired preselected position while the headstock is being driven by the prime mover at normal operating speed during the machining operation without effecting any change in the position of the shiftable gears SG.

When the operator moves the control lever back to neutral position, the plunger 46 again moves outwardly into the notch 47 in the shifter yoke 16 to immediately cut off communication of line 39a with the drain line 44 to cause pressure to immediately build up in the line 39 supplying the selector valve 40. As a result, the pressure is distributed to the selector valve to effect the next gear shift movement in accordance with the new preselected position. Also, under these conditions, the knob 42 of the selector valve 40 may be adjusted to directly select any desired speed before power is applied to drive the transmission.

Thus, the timer valve 45 is responsive to the operating condition of the headstock transmission, that is, whether or not it is being driven by the prime mover in one direction or the other. Whenever the driving power is disconnected from rotating the transmission and the brake applied, the selector valve 40 is rendered operative for direct selection of any desired speed change.

The timer valve 45 maintains pressure for a predetermined interval of time in the selector valve 40 to definitely effect the completion of the speed change as the driving power is applied to rotate the headstock transmission. The timer valve is then automatically operable after a predetermined interval of time to disconnect operating pressure from the selector valve 40 when the headstock has reached full operating speed so that the selector valve may then be adjusted to any particular predetermined position of speed selection without shifting the gears during operation of the headstock.

It is also to be noted that in connection with the pressure supply line 23, there is provided a branch line 23b which is connected to a lubricating discharge manifold 49 adapted to distribute lubricant to the various operating parts of the lathe headstock transmission. It will be noted, that under conditions when the timer valve 45 has its plunger 46 depressed and the time interval has elapsed, fluid pressure from the line 39a will be discharged into the drain line 44, but pressure will be maintained in the line 23 by the setting of the low pressure relief valve 26 of a sufficient value to at all times effect proper lubrication of the headstock transmission when it is being driven under normal operating conditions. A suitable gauge 50 may also be connected to the line 23b to indicate to the operator that satisfactory pressure conditions are being maintained for both lubrication and operation of the lathe headstock gear shifting and brake device.

It is to be further noted that during the normal operation of the headstock transmission, that the fluid pressure in the line 23 is maintained at the low predetermined value of setting of the low pressure relief valve 26 so that there is a relatively small back pressure against the pump 20 during normal operation of the lathe to thereby avoid excessive heating of the hydraulic fluid, the pump not being normally required to discharge through the high pressure relief valve 24 at any time unless some unusual stoppage would occur in the line 23 between the low pressure relief valve 26 and the pump 20.

There has thus been provided a highly efficient and simplified hydraulic gear shifting mechanism for a machine tool lathe headstock change speed transmission.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a transmission and control mechanism for a machine tool, a change speed transmission, a rate changing device for said transmission, and a time delay hydraulic valve for said rate changing device, responsive to the elapse of a predetermined interval of time initiated by the application of power to drive said transmission, to render said rate changing device effective for changing speed in said transmission and then deenergizing said rate changing device after a time delay.

2. In a transmission and control mechanism for a machine tool having a change speed transmission, a rate varying device for said transmission, and a time delay hydraulic valve for said rate varying device responsive to the elapse of a predetermined interval of time to change said rate varying device from a direct effective speed changing action on said transmission to a preselective condition of speed selection after a time delay.

3. In a machine tool having a change speed transmission, speed changing means for said transmission, and a time delay hydraulic valve for said speed changing means responsive to the initiation of rotation in said transmission to automatically render said speed changing means inoperable after a predetermined interval of time has elapsed since initiation of said transmission rotation, said means being automatically effective to allow speed changes to be made in said transmission when said transmission is brought to a stop.

4. In a hydraulic gear shifting mechanism for a lathe headstock having a change speed transmission, a main drive clutch mechanism for connecting or disconnecting driving power to rotate said transmission, and a series of shiftable gear elements, the combination of a fluid pressure pump, a hydraulic speed selector valve, and hydraulic shifting means for said shiftable gear elements connected to said selector valve so that adjustment of said selector valve effects a sequential shifting of said gear elements, means connecting pressure from said pump to said selector valve including a pressure regulating valve, and a time delay hydraulic valve actuated in timed relationship with the operation of said clutch mechanism to relieve fluid pressure from said pump to said selector valve to render said valve ineffective upon engagement of said clutch mechanism to drive said transmission.

5. In a hydraulic gear shifting mechanism for a lathe headstock having a change speed transmission, a main drive clutch mechanism for connecting or disconnecting driving power to rotate said transmission, and a series of shiftable gear elements, the combination of a fluid pressure pump, a hydraulic speed selector valve, and hydraulic shifting means for said shiftable gear elements connected to said selector valve so that adjustment of said selector valve effects a sequential shifting of said gear elements, means connecting pressure from said pump to said selector valve including a pressure regulating valve, and a time delay hydraulic valve actuated in timed relationship with the operation of said clutch mechanism to relieve fluid pressure from said pump to said selector valve to render said valve ineffective upon engagement of said clutch mechanism to drive said transmission, and further means for actuating said time delay valve upon disengagement of said clutch means to automatically supply fluid pressure from said pump to said selector valve for effective gear shifting operations.

6. In a lathe headstock gear shifting mechanism, a headstock housing, a shiftable gear change speed transmission in said housing, a main drive clutch for connecting and disconnecting a source of power to rotate said transmission, a series of hydraulic gear shifting devices associated with said transmission, a fluid pressure pump providing a source of fluid pressure connected to a hydraulic selector valve so that adjustment of said valve effects a sequential actuation of said gear shifting devices for selecting speed changes in said transmission, a timer valve interconnected between said pump supply to said selector valve and the fluid supply reservoir for said pump, and means for actuating said timer valve by the manipulation of said main drive clutch to maintain pressure in the supply line from said pump to said selector valve when said clutch is moved to disengaged position.

7. In a hydraulic gear shifting mechanism for a lathe headstock having a series of shiftable gears and a main drive clutch operable to connect or disconnect driving power to said transmission, hydraulic selector valve operated means for shifting said gears, a fluid pressure pump, means interconnecting said pump to said selector valve means including a low pressure relief valve, a timer by-pass control valve for connecting pressure discharge from said low pressure relief valve to atmospheric drain, and means for operating said valve in a predetermined relationship with the operative condition of said clutch so as to maintain pressure supply from said pump to said selector valve when said clutch is disengaged, and to momentarily maintain pressure to said selector valve from said pump for a predetermined interval of time from initial engagement of said clutch.

8. In a lathe headstock transmission hydraulic gear shifting mechanism including a selector valve, a fluid pressure pump supplying pressure to said valve, a time delay valve interconnected between said pump and selector valve operable to relieve the pressure of said pump from said selector valve, and means for actuating said time delay valve in a predetermined relationship to the application of driving power to said transmission so that fluid pressure will continuously be supplied to said selector valve when said transmission is stopped, and wherein fluid pressure will be supplied to said selector valve for a predetermined interval initiated by the application of power to drive said transmission, and after the elapse of said predetermined period fluid pressure will be released from said selector valve.

9. In a hydraulic gear shifting mechanism including a selector valve for effecting shifting of gear members in a change speed transmission, and a main drive clutch for connecting or disconnecting driving power to said transmission, a fluid pressure pump connected through a pressure reducing valve to said selector valve, a lubricating discharge manifold for said transmission connected between said pump and said pressure reducing valve, a time delay hydraulic valve connected between said pressure reducing valve and said selector valve, and means for simultaneously operating said clutch and regulating said time delay hydraulic valve.

10. In a hydraulic headstock gear shifting mechanism, a fluid pressure pump, a reservoir for supplying fluid to said pump, a high pressure relief valve in the pressure discharge line of said pump, a low pressure relief valve in said line, a selector valve for effecting speed changes in said headstock connected to the discharge of said low pressure relief valve, clutch means for connecting or disconnecting power for rotating said headstock transmission, a hydraulic valve connected between the discharge of said low pressure relief valve and said selector valve having an operating valve plunger, means for actuating said valve plunger and said clutch means in a predetermined sequential relationship so as to maintain pressure discharge from said low pressure relief valve to said selector valve when said clutch is disengaged, and a time delay hydraulic valve operated by said valve plunger for initially maintaining said pressure on said selector valve for a predetermined interval of time after said clutch means has been engaged.

11. In a lathe headstock hydraulic speed changing system including a selector valve operable to effect speed changes in said transmission, and a main drive clutch and fluid pressure operated brake device operable to apply driving power or arrest rotation of said transmission, a fluid pressure pump, a low pressure relief valve interconnected between said pump and said selector valve, a time delay hydraulic valve actuable by the adjustment of said clutch connected between the output of said low pressure relief valve and said selector valve, and fluid conducting means connected between said brake and said pump and said low pressure relief valve, and common control means for actuating said clutch and brake device and said time delay hydraulic valve in a predetermined sequential operation for regulating the operativeness of said selector valve in accordance with the operating condition of said transmission.

12. In a change speed transmission control mechanism for a lathe comprising a shiftable gear change speed transmission, a selecting device for effecting various speed changes in said transmission, means for connecting or disconnecting power for driving said transmission including a hydraulic brake to arrest rotation of said transmission when said power means is disconnected, a fluid pressure pump including a high pressure relief valve for the output of said pump, a fluid reservoir supplying fluid to said pump, a low pressure relief valve connected to the output of said pump, fluid conducting means connecting said hydraulic brake actuating device to said pump and the input of said low pressure relief valve, a lubricating discharge manifold for said transmission connected between said pump and the input of said low pressure relief valve, means interconnecting said discharge from said low pressure relief valve, said selecting means, and a time delay hydraulic valve for relieving pressure applied to said selecting means, and a common control member for adjusting said clutch means, said hydraulic brake means, and said time delay hydraulic valve in a predetermined sequential relationship.

13. In a machine tool having a change speed transmission, a source of driving power connectable to rotate said transmission, a speed changing mechanism for said transmission, a time delay hydraulic valve, and means operated by said time delay hydraulic valve to render said speed changing mechanism operative when said transmission is stopped by disconnection of said source of driving power and to render said speed changing mechanism inoperative after a predetermined interval of time has elapsed from initial connection of said source of driving power for rotation of said transmission.

HAROLD J. SIEKMANN.
HARRY C. KEMPER.

REFERENCES CITED

The following references are of record in the file of this patent:

UNITED STATES PATENTS

| Number | Name | Date |
|---|---|---|
| 1,653,576 | Klausmeyer | Dec. 20, 1927 |
| 2,010,556 | Nenninger | Aug. 6, 1935 |
| 2,012,082 | Heiber et al. | Aug. 20, 1935 |
| 2,203,743 | Parsons | June 11, 1940 |
| 2,230,777 | Hey | Feb. 4, 1941 |